United States Patent [19]

Tunc

[11] Patent Number: 5,319,038
[45] Date of Patent: Jun. 7, 1994

[54] PROCESS OF PREPARING AN ABSORBABLE POLYMER

[75] Inventor: Deger Tunc, East Brunswick, N.J.

[73] Assignee: Johnson & Johnson Orthopaedics, Inc. g35, Raynham, Mass.

[21] Appl. No.: 15,716

[22] Filed: Feb. 9, 1993

[51] Int. Cl.$^5$ .................. C08G 63/91; C08L 67/00
[52] U.S. Cl. .................... 525/415; 549/274; 528/354; 528/361
[58] Field of Search ............... 528/354, 361; 549/274; 525/415

[56] References Cited

U.S. PATENT DOCUMENTS

| | | | |
|---|---|---|---|
| 3,463,158 | 8/1969 | Schmitt et al. | 128/334 |
| 3,626,948 | 12/1971 | Glick et al. | 128/334 |
| 3,636,956 | 1/1972 | Schneider | 128/335 |
| 3,739,773 | 6/1973 | Schmitt et al. | 128/92 |
| 3,797,499 | 3/1974 | Schneider | 128/334 |
| 3,839,297 | 10/1974 | Wasserman | 128/335.5 |
| 4,550,449 | 11/1985 | Tunc | 623/16 |
| 4,960,866 | 10/1990 | Bendix et al. | 528/499 |
| 5,023,350 | 6/1991 | Bhatia | 549/274 |

OTHER PUBLICATIONS

R. K. Kulkarni, et al.; Journal of Biomedical Materials Research; vol. 5, pp. 169-181 (1971).

*Primary Examiner*—John Kight, III
*Assistant Examiner*—Terressa Mosley
*Attorney, Agent, or Firm*—Michael Q. Tatlow

[57] ABSTRACT

A process of purifying and stabilizing a high molecular weight polylactide polymer by contacting solid polymer particles with methyl alcohol and subsequently acetone.

4 Claims, No Drawings

PROCESS OF PREPARING AN ABSORBABLE POLYMER

BACKGROUND OF THE INVENTION

The present invention relates to the process of preparing absorbable polymers that are used in the manufacture of Internal Bone Fixation Devices and Implants. These devices are generally made of polymers with very high molecular weight polyL(—)lactide and copolymers of lactide and other poly(alpha-hydroxy acid esters).

PRIOR ART

Medical products such as synthetic absorbable sutures, bone plates, bone pins and screws made from absorbable polymers have been known for some time. These products are generally made from alpha hydroxy polyester polymers. The advantage of the use of synthetic absorbable polymers for internal bone fixation devices is the fact that it is not necessary to perform a second surgical procedure to remove such fixation devices after they have accomplished their purpose. U.S. Pat. Nos. 3,463,158; 3,636,956; 3,739,773; 3,797,499 and 3,839,297 disclose bone fixation devices made from synthetic polymers which are either polylactides, polyglycolides or copolymers of lactide and glycolide.

U.S. Pat. No. 4,550,449 discloses absorbable bone fixation devices made from very high molecular weight polymers and copolymers containing L(—)lactide monomers as well as copolymers of L(—)lactide with minor amounts i.e. 10% or less of compatible comonomers. The comonomers include Alpha-hydroxypropanoic acid
Alpha-hydroxyacetic acid
beta-propiolactide
tetramethylglycolide
beta-butyrolactone
gamma-butyrolactone
pivalolactone
alpha-hydroxybutyric acid
alpha-hydroxyisobutyric acid
alpha-hydroxyvaleric acid
alpha-hydroxyisovaleric acid
alpha-hydroxycarpoic acid
alpha-hydroxyisocaproic acid
alpha-hydroxy-alpha-ethylbutyric acid
alpha-hydroxy-beta-methylvaleric acid
alpha-hydroxyheptanoic acid
alpha-hydroxyoctanoic acid
alpha-hydroxydecanoic acid
alpha-hydroxymyristic acid
alpha-hydroxystearic acid
dimethylglycolide
polymethylglycolide
diethylglycolide
dibutylglycolide
caprolactone
valerolactone
decalactone
propiolactone
dioxanone
substituted dioxanones
trimethylene carbonate
ethylene carbonate
propylene carbonate The polymers disclosed in U.S. Pat. No. 4,550,449 differ from the polymers disclosed in the earlier mentioned patents in that the molecular weight of the polymers disclosed in U.S. Pat. No. 4,550,449 is much higher than the molecular weight of the polymers disclosed in the other patents.

It has also been known that the presence of unreacted monomer in polymers of this type tends to accelerate the breakdown of the polymers when the polymers are implanted in an animal body. U.S. Pat. No. 3,626,948 is directed to a process of purifying polyglycolic acid by removing vaporizable impurities including unreacted monomers.

It has also been determined that the presence of residual catalysts in these polymers may lead to the uncontrolled breakdown of the polymer and the absorption of the polymers in an implanted structure at an unpredictable rate. U.S. Pat. No. 4,960,866 discloses a process of reducing the residual catalyst in polylactide polymers and copolymers by dissolving the polymer and recrystallizing the polymer. A similar process is disclosed in an article by Kulkarmi et. al. in the Journal of Biomedical Materials Research, Vol.5, pages 169–181 (1971). In these prior art processes, the polymers are generally of a molecular weight substantially less than the molecular weight of the polymer disclosed in U.S. Pat. No. 4,550,449.

The dissolution and precipitation or recrystallization process used in the above mentioned patent and journal article are more suitable for lower molecular weight polymers than for the purification of very high molecular weight polymers such as those taught in U.S. Pat. No. 4,550,449. In order to dissolve the polymers of high molecular weight, as indicated by an inherent viscosity above about 4.5, the dissolution and recrystallization or precipitation processes would require prolonged time periods to dissolve the polymers and excessive amounts of solvents in order to accomplish the dissolution of the polymer. In addition, the precipitation recrystallization of the polymer into particles would require large amounts of precipitating agents.

SUMMARY OF THE INVENTION

The present invention is directed to the purification of very high molecular weight polymers of L(—)lactide and copolymers of such lactides with other comonomers. The present process includes the extraction of particles of the solid polymer with methyl alcohol at ambient temperature and the extraction of unreacted monomer and any residual catalyst with acetone. The extraction of the solid polymer with methanol is believed to stabilize the polymer rather than remove impurities. The contact of the polymer with methanol may esterify the carboxylic acid end group of the polymer and thereby stabilized the polymer by reducing the rate of depolymerization. Other low molecular weight alcohols, i.e. C-2 to C-4 alcohols are also useful to esterify the carboxylic end group but methanol is preferred.

The high molecular weight polymer is made in a reaction vessel and is usually removed from the vessel as a large block. The block of polymer is ground in a mill into small particles. The particles are generally less than one half inch in size. The preferred particle size is less than 10 millimeters and the most preferred particle size is between 1 and 6 millimeters. Polymer having a particle size larger than about 10 millimeters requires long periods of contact with the particular solvents. Polymers having a particle size less than one millimeter are difficult to handle because of the fine size.

The extraction steps are performed for periods of from 10 to about 24 hours at room temperature with agitation of the solid polymer particles with the solvent used in the extraction process. The polymer is separated from the methanol after the first extraction step by filtration and is separated from the acetone after the second extraction step also by filtration. The polymer particles are then dried and packaged in an inert atmosphere until the polymer is fabricated into the desired implantable device.

Generally, the amount of solvent used is between 2.5 and 25 parts by weight to 1 part by weight of the polymer. The ratio of 2.5 to 1 is the preferred amount but excessive solvent could be used if desired. The solvent extraction step is carried out at room temperature or a temperature slightly above room temperature. It is not necessary to carry out the solvent extraction step at the relatively high temperatures required in the processes of purifying polylactide polymers by dissolution and recrystallization. Following each extraction step the solid polymer is filtered to separate the polymer particles from the solvent. After the acetone extraction the polymer is dried in a vacuum oven at temperatures of 40° to 50° C. at 1.0 mm Hg for 48 hours and then stored in an inert atmosphere until used.

In the following examples the inherent viscosity determinations were made by dissolving the polymer in chloroform at a concentration of 0.1 gram per deciliter of chloroform. The inherent viscosity determination were made at 25° C. All the test specimens that were implanted measured 20 mm by 3 mm by 1 mm. The in-vitro evaluations were performed by incubating the specimens in a Buffer solution at 37° C. plus or minus 0.5° C. and testing three specimens for tensile strength and three specimens for flexural strength for each of the test periods up to 24 weeks. The in-vivo tests in example 1 were performed by implanting identical specimens to the one used in the in-vitro tests in the dorsal subcutaneous tissues of rats, four specimens per animal. The specimens were explanted at various sacrifice periods and tested with the in-vitro specimens. The tin content of the polymer is determined by atomic absorption.

The percent weight loss (% wt loss) is a measure of the percent of volatile material in the particular sample. It was determined by thermogravimetric analysis (TGA).

The following examples show the improved results obtained by the present invention.

EXAMPLE 1

This example illustrates the degradation in molecular weight (as measured by inherent viscosity) and the change in mechanical properties of the unpurified/unstabilized, i.e., untreated polylactide. This will be the basis for comparison with the PLA samples treated with the process of the present invention and other prior art processes.

Test specimens were fabricated from poly[L(−)lactide], (PLA) having inherent viscosity 7.1, determined in chloroform at concentration of 0.1 g/dl. at 25° C. Inherent viscosity is a parameter which is logarithmically related to molecular weight. Test specimens measured 20×3×1 mm.

In-vitro evaluation of the specimens were done by incubating the specimens in Buffer-7 solution at 37±0.5° C. and testing 3 specimens for tensile and 3 specimens for flexural properties at each test period up to 24 weeks.

At each test period, the inherent viscosity of the polymer was determined to follow the rate of depolymerization with time.

In-vivo tests were done by implanting identical specimens to the ones used before in dorsal subcutaneous tissues of rates, 4 specimens per animal. The specimens were explanted at various sacrifice periods as indicated in the tables and tested as indicated. The samples were tested for bending modulus, ultimate tensile strength (UTS) and yield strengths.

Results are shown in Tables IA and IB.

TABLE 1A

| | In-vitro Testing of High MW PLA No of Weeks | | | | |
|---|---|---|---|---|---|
| | 0 | 4 | 8 | 12 | 24 |
| Bending Modulus, MPa | 5098 | 4760 | 4174 | 3899 | 3032 |
| UTS, MPa | 57.1 | 41.6 | 26.6 | 9.3 | — |
| Yield Strength, Mpa | 48.2 | 39.0 | 23.0 | 7.8 | — |
| Inherent Viscosity | 7.1 | 3.4 | 2.2 | 1.5 | 0.9 |

TABLE 1B

| | In-vivo Test Results of High MW-PLA No of Weeks | | | | |
|---|---|---|---|---|---|
| | 0 | 4 | 8 | 12 | 24 |
| Bending Modulus, MPa | 5098 | 4516 | 4516 | 3570 | 2757 |
| UTS, MPa | 57.1 | 29.9 | 21.9 | 17.8 | — |
| Yield Strength, MPa | 48.2 | 26.4 | 18.4 | — | — |
| Inherent Viscosity | 7.1 | 3.0 | 1.9 | 1.4 | 0.9 |

Table IA illustrates that in the in-vitro testing of the unpurified PLA, about 16% of the initial tensile strength and yield strength is retained after 12 weeks of incubation in Buffer-7.

Table IB illustrates that the reduction in tensile strength is about 31% in 12 weeks in-vivo.

EXAMPLE 2

This example illustrates the effect of removing the unreacted monomer by vacuum devolatization method and the strength retention of the polymer treated by devolatilized.

Devolatilization

This process involves the following steps:
1. Grind PLA using a grinder with 4 mm screen
2. Apply vacuum to ground PLA for 16 hours at room temperature.
3. Heat the PLA under vacuum to 110° C. and maintain it for 24 hours under continuous tumbling.
4. Cool to room temperature.

Chemical analysis results of this devolatilized PLA is shown below:

| i.v. dl/g | Sn, ppm | % WT loss |
|---|---|---|
| 7.66 | 39.4 | 0.6 |

ASTM test specimens that were injection molded from the devolatilized PLA were incubated in Buffer-7 at 37° C. and tested for ultimate tensile strength, bending modulus and for maximum fiber stress. Results are shown in Table II.

TABLE II

| Property Tested | Time of Incubation In Buffer-7 at 37° C., Weeks | | | |
|---|---|---|---|---|
| | 0 | 4 | 8 | 12 |
| UTS, MPa | 77.9 | 45.4 | 35.2 | 25.2 |
| Bending Modulus, MPa | 5617 | 3332 | 2529 | 2227 |
| Max. Fiber Stress. MPa | 132.0 | 87.8 | 65.7 | 55.4 |

This table demonstrates that about 32% of the initial strength is retained after 12 weeks of incubation using a vacuum devolatization procedure to remove unreacted monomer.

EXAMPLE 3

This example illustrates the effect of a solid-liquid extraction purification treatment which removes most of the unreacted monomer and the catalyst from the polymer. This process is carried out as follows:
1. Ground PLA is extracted in dry acetone at room temperature for 24 hours with vigorous stirring utilizing 2.5 parts by weight of acetone for one part by weight of dry polymer.
2. The acetone is separated from the polymer by filtration.
3. Step 1 is repeated
4. Step 2 is repeated
5. The PLA is dried under vacuum Analysis results of the PLA before and after this purification is summarized in the following table.

| Treatment | IV dl/g | Sn, ppm | % Wt loss |
|---|---|---|---|
| Unpurified PLA | 6.18 | 88.9 | 5.0 |
| Purified as described | 6.67 | 44.2 | 1.5 |

ASTM test specimens were injection molded from the treated PLA and evaluated before and after incubation in Buffer-7 at 37° C.

The results are summarized in Table III:

TABLE III

| Property Tested | Time of Incubation In Buffer-7 at 37° C., Weeks | | | |
|---|---|---|---|---|
| | 0 | 4 | 8 | 12 |
| Bending Modulus, MPa | 5334 | 4231 | 3483 | 2256 |
| UTS, MPa | 71.7 | 48.1 | 33.5 | 22.7 |
| Max. Fiber Stress. MPa | 123.8 | 101.7 | 87.9 | 62.2 |

Table III indicates that the removal of the unreacted monomer and most of the catalyst from the polymer is sufficient to slow down the loss of mechanical properties of the polymer. At 12 weeks, about 32% of the original strength is retained compared to 16% of the untreated polymer as shown in Table I.

EXAMPLE 4

This example illustrates the present invention.
1. Extraction in Methanol
13.4 kg of ground PLA is extracted in 33.5 kg dry methanol by vigorous stirring of 345 rpm at around 21° C. over a period of 24 hours.
2. Filtration to Remove Methanol
Methanol is removed from the polymer by filtration.
3. Extraction in Acetone
Polymer from Step 2 is stirred in 33.5 kgs dry acetone for 24 hours at about 20° C.
4. Filtration to Remove Acetone
Acetone is removed from the polymer by filtration.
5. Drying
  a. The polymer is dried at 38° C. oven overnight.
  b. A vacuum at 18° C. for 24 hours.
  c. The polymer is then purged with nitrogen every 4 hours for 48 hours while keeping the polymer at 43° C. and under vacuum.
  d. The dried PLA is transferred into plastic bags under nitrogen for storage until use.

Analysis results of the PLA purified and stabilized is shown below:

| Sample No. | Treatment | IV dl/g | Sn, ppm | % Wt loss |
|---|---|---|---|---|
| 1 | None | 6.18 | 88.9 | 5.0 |
| 2 | Purified/Stabilized | 5.46 | 27.9 | 0.8 |

Evaluation of this Polymer

ASTM test specimens were injection molded from this purified/stabilized PLA. These were tested before and after incubation in Buffer-7 at 37° C.

Test results are shown in Table IV below:

TABLE IV

| Property Tested | Time of Incubation In Buffer-7 at 37° C., Weeks | | | |
|---|---|---|---|---|
| | 0 | 4 | 8 | 12 |
| Bending Modulus, MPa | 5283 | 5187 | 4518 | 4010 |
| UTS, MPa | 74.6 | 71.2 | 68.4 | 55.8 |
| Max. Fiber Stress. MPa | 128.4 | 126.2 | 120.4 | 114.5 |

A comparison of the properties in this table with any of the properties of PLA purified by other methods as described in examples 2 and 3 and with the properties of unpurified PLA summarized in Example 1 clearly shows that the process of example 4 results in a very distinct advantage of retaining all of the properties of the polymer at higher levels for longer periods of time. The ultimate tensile strength at 12 weeks is about 75% of the initial strength. Furthermore the strength at 12 weeks is 6 times higher than the tensile strength at that time for the unpurified PLA.

Although the exact mechanism which provides the increased strength cannot be accurately determined, it may be caused by the esterification of the carboxylic acid end group of the poly(alpha-hydroxy-carboxylic) acids. The ester end group may slow down the rate of depolymerization of the polymer which would result in a slower rate of loss of strength of a device made from the polymer purified as in Example 4. The esterification is difficult to detect. However, applicant has extracted a polylactide polymer with methanol at a liquid/solid ratio of 25 to 1 for 96 hours and determined the presence of the acid and ester end groups by Nuclear Magnetic Resonance spectroscopy. The test detected less than 0.01 mole percent ester and 0.64 mole percent acid for the untreated sample and 0.27 mole percent ester and 0.26 mole percent acid for the treated sample.

I claim:

1. Process of purification and stabilization of a high molecular weight polylactide comprising reducing the polylactide into small particles contacting the polylactide particles with dried methyl alcohol for a period of at least 10 hours at room temperature, filtering the polylactide particles to separate the methyl alcohol from the particles, and contacting the polylactide particles with dry acetone for a period of at least 10 hours at room temperature, filtering the polylactide particles to remove the acetone and drying the PLA particles and storing the polylactide in an inert atmosphere.

2. The process of claim 1 in which the polylactide is reduces to particles having a size of less than 10 millimeters.

3. The process of claim 2 in which the polylactide is reduces to particles having a size of from 1 to 6 millimeters.

4. The process of claim 1 in which the polylactide particles are contacted with methyl alcohol for 24 hours.

* * * * *